United States Patent
Brevick et al.

(10) Patent No.: US 7,343,902 B2
(45) Date of Patent: Mar. 18, 2008

(54) DUAL COMBUSTION MODE ENGINE

(75) Inventors: John Brevick, Livonia, MI (US);
Clifford Carlson, Fenton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 53 days.

(21) Appl. No.: 11/276,214

(22) Filed: Feb. 17, 2006

(65) Prior Publication Data

US 2007/0193557 A1    Aug. 23, 2007

(51) Int. Cl.
*F02D 17/02* (2006.01)

(52) U.S. Cl. ............... 123/481; 123/198 F; 123/294

(58) Field of Classification Search ............ 123/27 R, 123/198 F, 294, 435, 481
See application file for complete search history.

(56) References Cited

U.S. PATENT DOCUMENTS

| | | | | |
|---|---|---|---|---|
| 4,455,984 A | * | 6/1984 | Merlini et al. ............... | 123/481 |
| 5,408,974 A | * | 4/1995 | Lipinski et al. ............. | 123/481 |
| 6,662,785 B1 | | 12/2003 | Sloane | |
| 6,668,790 B2 | * | 12/2003 | Chmela et al. ............. | 123/295 |
| 6,681,751 B1 | * | 1/2004 | Ma .............................. | 123/481 |
| 6,752,104 B2 | * | 6/2004 | Fiveland et al. .......... | 123/27 R |
| 2004/0084010 A1 | | 5/2004 | Kurtz | |
| 2004/0182359 A1 | | 9/2004 | Stewart et al. | |

FOREIGN PATENT DOCUMENTS

GB        2418228        *   3/2006

* cited by examiner

*Primary Examiner*—T. M Argenbright
(74) *Attorney, Agent, or Firm*—Diana D. Brehob

(57) ABSTRACT

A system and method to provide a desired torque increase from an engine in which some cylinder operate in spark ignition (SI) combustion mode only and some cylinders operate in homogeneous-charge, compression-ignition (HCCI) combustion mode only are disclosed. Such method includes: operating a first portion of engine cylinders in homogeneous charge compression ignition combustion mode while a second portion of engine cylinders are deactivated. The second portion of engine cylinders in spark ignition combustion mode is activated when a torque demand is greater than the first portion of engine cylinders is capable of supplying. Also, the second portion of engine cylinders is activated when a rate of torque demand is greater than the first portion of engine cylinders is capable of supplying.

19 Claims, 5 Drawing Sheets

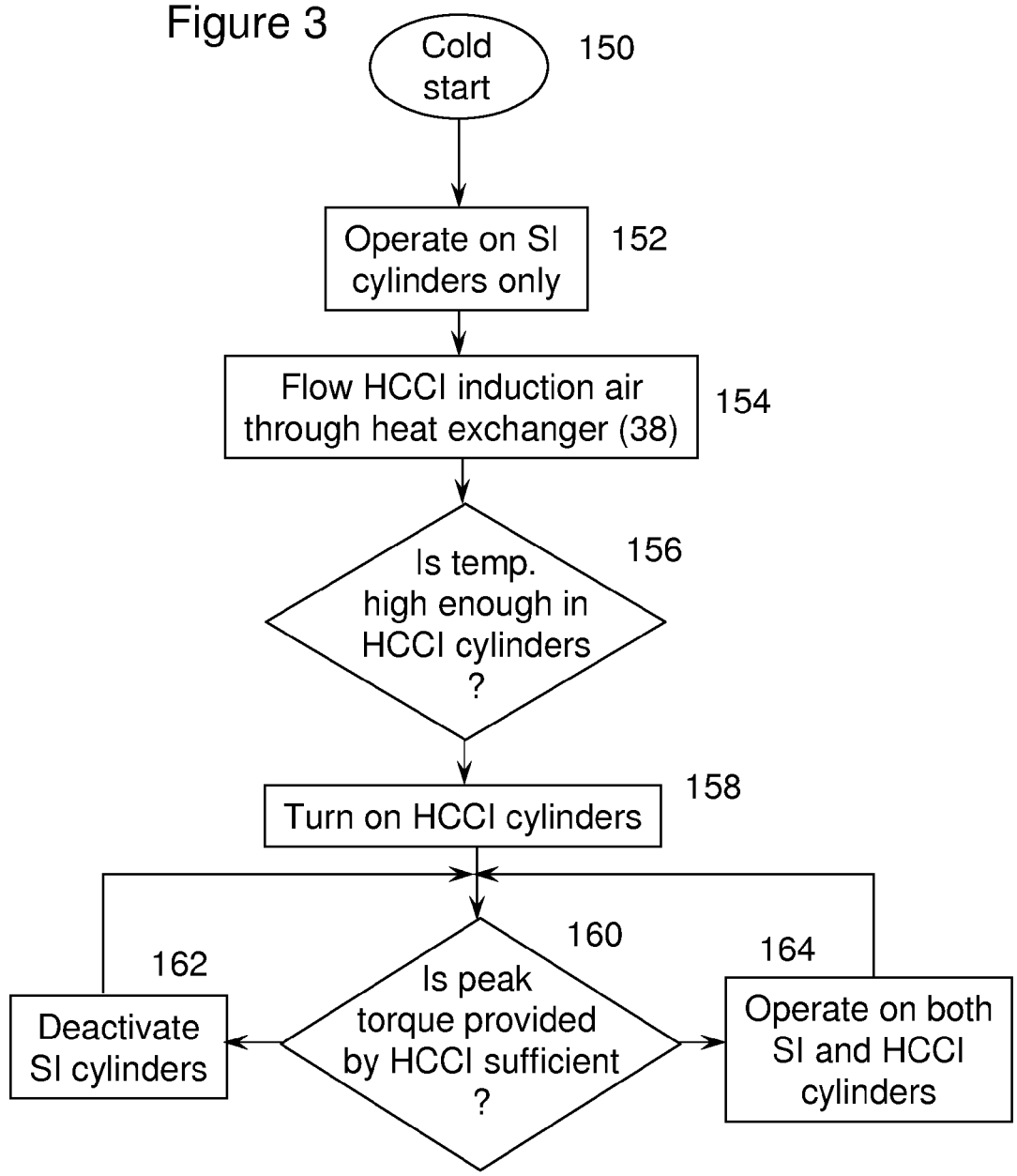

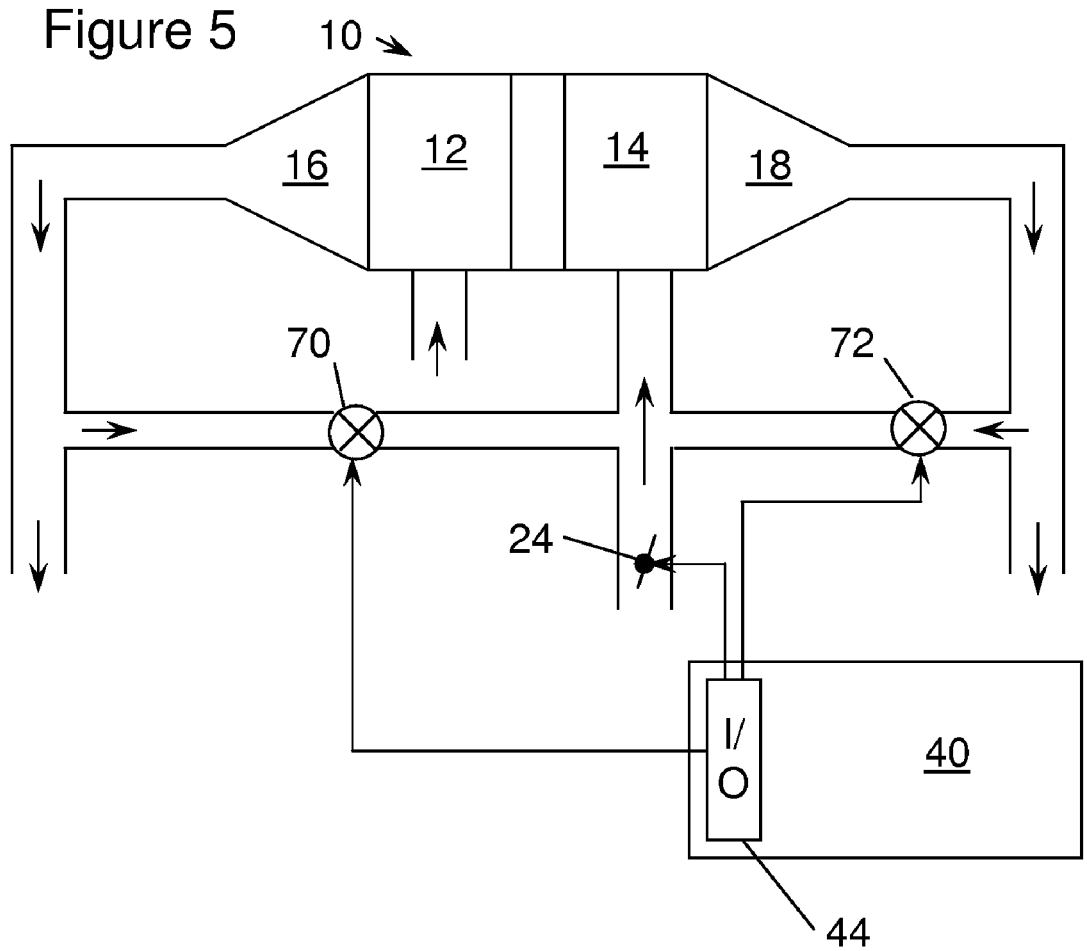

DUAL COMBUSTION MODE ENGINE

FIELD OF INVENTION

The present invention relates to an internal combustion engine in which a portion of cylinders exclusively operate under a spark-ignition combustion mode and remaining cylinders exclusively operate under a homogeneous-charge, compression-ignition mode.

BACKGROUND OF THE INVENTION

Homogeneous-charge, compression-ignition combustion is known to those skilled in the art to provide high fuel efficiency and low emission operation in internal combustion engines. However, HCCI operation is feasible in a narrow range in engine torque, approximately one-third of the torque range of a conventional spark-ignited engine. Thus, most HCCI engines being developed are dual mode engines in which HCCI is used at low torque conditions. When a higher torque is desired, operation is transitioned to an alternative combustion mode, such as spark-ignition combustion or heterogeneous, compression-ignition combustion (diesel). Challenges accompanying such transitions include: torque matching (providing driver demanded torque during the transition interval), maintaining emission control, and robustly returning to HCCI combustion, to name a few. Another difficulty encountered in engines which transition from one combustion mode to another is that the combustion system geometry cannot be optimized for either combustion mode, but is instead a compromise. For example, a desirable compression ratio for HCCI combustion is about 15:1 and about 10.5:1 for spark-ignition combustion.

A disadvantage of HCCI combustion is its inferior transient response to a demand for a change in torque, orders of magnitude slower than SI combustion. The inventors of the present invention have recognized that HCCI operation cannot provide a vehicle operator with the responsiveness that they have come to expect from a SI engine.

In U.S. patent application 2004/0182359, an 8-cylinder HCCI/SI engine is described in which HCCI to SI transitions are made one cylinder at a time, i.e., at a lower torque demand all 8 cylinders are operating in HCCI combustion mode and as torque demand exceeds what HCCI combustion can provide, cylinders are individually switched to SI operation. The inventors of the present invention have recognized that it would be desirable to have an engine which provides the desired range in output torque at the high efficiency of HCCI combustion without having to undergo a combustion mode transition in any given cylinder because of the compromises inherent in designing a cylinder to operate robustly and efficiently in both HCCI and SI combustion modes over a wide operating range.

SUMMARY OF THE INVENTION

A system and method to provide a desired torque increase from an engine in which some cylinder operate in SI combustion mode only and some cylinders operate in HCCI combustion mode only are disclosed. Such method includes: operating a first portion of engine cylinders in homogeneous charge compression ignition combustion mode while a second portion of engine cylinders are deactivated. The second portion of engine cylinders in spark ignition combustion mode is activated when a torque demand is greater than the first portion of engine cylinders is capable of supplying. The second portion of engine cylinders is activated when a rate of torque demand is greater than the first portion of engine cylinders is capable of supplying.

The first and second portions of cylinders are mutually exclusive, the first portion having a compression ratio at least two ratios greater than the second portion. When torque demand is reduced so that the first portion of cylinder is capable of supplying the torque, the second portion of engine cylinders is deactivated. Such cylinders are deactivated by deactivating intake and exhaust valves coupled to the cylinders.

An advantage of the present invention is that the SI cylinders, which have a lesser fuel efficiency than HCCI cylinders, are utilized only when needed to make up torque that the HCCI cylinders cannot provide. This makeup torque can be due to a torque level that the HCCI cylinders are incapable of providing or a rate of torque increase that the HCCI cylinders are incapable of providing. By relying on HCCI cylinders whenever possible, fuel efficiency is optimized.

Also disclosed is a method to respond to an increased demand for torque in an engine in which a portion of engine cylinders are operating in HCCI mode and the remaining cylinders are operating in SI mode whereby fuel delivery to the SI cylinders is increased to meet the demand. The fuel supplied to the HCCI cylinders stays roughly constant. At this new torque level, fuel delivery to the first portion of cylinders is increased and fuel delivery to the second portion of cylinders is decreasing, the increasing and decreasing such that demanded torque level is provided by the engine.

An advantage of the present invention is that it overcomes the inferior response of HCCI engines by activating SI cylinders to provide the desired torque increase. That is, it is not necessary to endure the slow ramp up of HCCI cylinders to meet a torque increase demand. Instead, the SI cylinders are brought online immediately to fill a torque gap. Following such an activation of SI cylinders, torque from the HCCI cylinders is ramped up and if HCCI can provide the desired torque level, the SI cylinders are once again deactivated once the HCCI torque has ramped up. By using the HCCI cylinders as much as possible to provide the desired torque, the fuel efficiency is improved.

In the event that HCCI cylinders are incapable of providing the level of torque desired, SI cylinders remain activated. However, torque is provided by HCCI cylinders using SI cylinders as little as possible, i.e., just to provide makeup torque. Again, this provides the advantage of the best fuel efficiency at a particular engine operating condition.

BRIEF DESCRIPTION OF THE DRAWINGS

The advantages described herein will be more fully understood by reading an example of an embodiment in which the invention is used to advantage, referred to herein as the Detailed Description, with reference to the drawings wherein:

FIG. 3 is a flowchart of a cold start strategy;

FIG. 5 is a schematic of the exhaust gas recirculation according to an aspect of the present invention.

DETAILED DESCRIPTION

Figure 1:
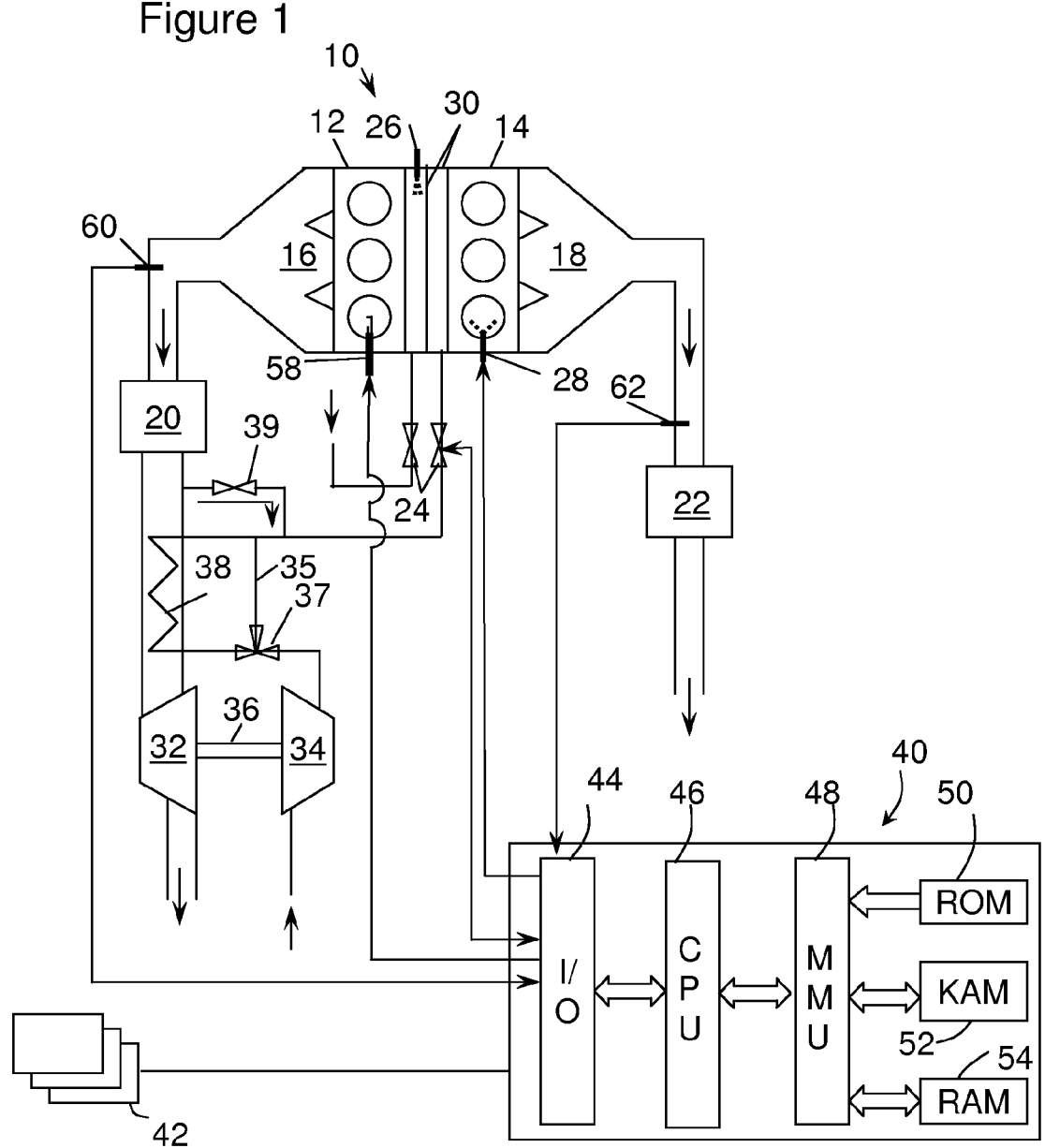
FIG. 1 is a schematic of an internal combustion engine according to an aspect of the present invention.

In FIG. 1, a multi-cylinder internal combustion engine 10 is shown. By way of example, engine 10 is shown to have six cylinders, two banks of 3 cylinders each. One bank of cylinders 12 is adapted to operate in a conventional spark-ignition (SI) mode. The other bank of cylinders 14 is adapted to operate in a homogeneous-charge, compression-ignition (HCCI) mode. Combustion air is provided to the cylinder banks via an intake manifold 30, which is separated such that air for cylinder bank 12 does not mix with air for cylinder bank 14. Each bank is provided with a throttle valve 24, or other means to control flow. SI combustion characteristically occurs at stoichiometric proportions of air and fuel, meaning that if combustion were complete, all the fuel and oxygen would be completely combusted to $H_2O$ and $CO_2$. To control the amount of torque produced in SI combustion, the amount of air is controlled by throttle valve 24. The amount of fuel added to the air, via injector 26, is metered to provide a stoichiometric mixture. For clarity, only one fuel injector 26 is shown in FIG. 1 for the 3 cylinders of bank 12. However, each cylinder is provided a fuel injector. Similarly, each cylinder in bank 14 is provided with a fuel injector like fuel injector 28. In FIG. 1, bank 12 is shown with a port injector in which fuel is sprayed outside of the cylinder and is brought into the cylinder with the combustion air and bank 14 is shown with a direct fuel injector in which fuel is sprayed directly into the combustion air which has been inducted into the cylinder. These types of fuel injection systems are shown by way of example. Both banks could be provided with port injection or both with direct injection according to the present invention. I.e., both HCCI and SI combustion can be accomplished with port, direct, or a combination of port and direct injection. Alternatively, fuel is provided by central body injection for either combustion mode.

Again, for clarity, only one of the three spark plugs for each of the cylinders of bank 12 is shown. Bank 14 cylinders may also have spark plugs. Although the bank 14 cylinders are HCCI cylinders, which indicates that combustion is initiated by compression ignition, it is known to those skilled in the art that at some operating conditions, it is useful to employ spark assist to initiate combustion. Alternatively, another ignition assist device such as glow plugs, plasma jet igniters, catalytic assisted glow plugs, as examples, could be used for ignition assist in HCCI. In SI combustion, a spark initiates a flame kernel and a flame front travels throughout the cylinder. In spark assisted HCCI, a spark initiates a flame kernel at the location of the spark plug. However, the mixture in the cylinder is too weak (not enough fuel or too much burned gases in the mixture) to sustain a flame front traveling through the cylinder gases. The flame kernel combusts the fuel-air mixture near the spark plug. The release of energy by the combustion of the mixture near the spark plug increases the pressure in the cylinder thereby causing the gases away from the spark plug to attain their ignition temperature and to self-ignite. When spark assist HCCI is contemplated, all HCCI cylinders are provided with a spark plug 58.

Engine 10 is shown to be a 6-cylinder with bank 12 being SI and bank 14 being HCCI by way of example. This is not intended to be limiting. Engine 10 has any number of cylinders greater than one and in any configuration: in-line, V, W, radial, opposed, or any other cylinder arrangement. The HCCI and SI cylinders need not be segregated by banks. There could be HCCI and SI cylinders on any given bank. However, as mentioned above, the intake gases to the HCCI cylinders and SI cylinders remain separated and exhaust gases coming from HCCI cylinders and SI cylinders also remain separated. Thus, such arrangements may require complicated manifolding to maintain the separation. An expected arrangement is that every other cylinder in the firing order is alternately HCCI and SI.

SI engines are typically produced with a 9.5-10.5:1 compression ratio, which is the ratio of the volume in the cylinder above the piston when the piston is at the top of its travel divided by the volume in the cylinder above the piston when the piston is at the bottom of its travel. HCCI combustion occurs more favorably with a higher compression ratio: 13-15:1. In prior art engines in which combustion mode is transitioned, the compression ratio selected is a compromise between the two compression ratios. According to the present invention, however, because each cylinder is optimized for a single combustion mode, the engine is produced with the compression ratio appropriate for the particular combustion mode. Thus, unlike prior art engines, the engine according to the present invention has some cylinders with a substantially higher compression ratio than other cylinders.

HCCI combustion occurs in a dilute mixture, either very lean of stoichiometric with excess air and/or with a very high level of exhaust dilution. It is well known to those skilled in the art to provide exhaust dilution by either recirculating exhaust gases into the engine intake, known as exhaust gas recirculation (EGR) sometimes referred to as external EGR, or to retain exhaust gases in the cylinder from a prior combustion event to mix with the combustion gases of an upcoming combustion event, commonly known as internal EGR. The latter is often achieved by valve timing adjustments. Typically exhaust gases are routed from an exhaust duct to an intake duct via a control valve (EGR valve). The present invention provides for an alternative configuration for EGR in which gases exhausted from the SI cylinder bank 12 are routed to the intake of the HCCI cylinder bank 14 via valve 39. In FIG. 1, the exhaust gases are collected downstream of exhaust gas aftertreatment device 20. This is shown by way of example and not intended to be limiting. The exhaust gases can be taken from any position in the exhaust duct. There are two advantages for circulating exhaust gases from the SI bank 12 to the HCCI bank 14. Typically, SI combustion occurs with a stoichiometric mixture, which provides combustion gases containing primarily $CO_2$, $H_2O$, and $N_2$. In contrast, HCCI cylinders combust lean mixtures which have excess air. Thus, HCCI exhaust gas has significant levels of $O_2$ and more $N_2$ than a SI exhaust gas. To obtain a desired diluent fraction, a greater amount of HCCI exhaust gas is recycled compared with the SI exhaust gas quantity. It is well known to those skilled in the art that to achieve ignition in HCCI, it is common to heat the intake air. Because the exhaust gas temperature is higher with SI combustion, less intake heating is required when the EGR employed comes from SI combusting cylinders. In particular, with reference to FIG. 1, gas from the exhaust duct coupled to cylinder bank 12 is drawn through EGR system 39 and supplied to the intake of cylinder bank 14 via a control valve.

Continuing with FIG. 1, each cylinder bank is provided with an exhaust gas aftertreatment device, 20 and 22. In one embodiment, device 20 is a three-way catalyst, which efficiently oxidizes CO and hydrocarbons and reduces nitrogen oxides (NOx) when provided a stoichiometric exhaust gas. As mentioned above, obtaining higher fuel efficiency motivates HCCI development. Another advantage of HCCI combustion, which occurs in a very lean or dilute mixture, is that it produces very low levels of NOx, particularly compared to SI operation. In one embodiment, the HCCI cylinders require no NOx aftertreatment and aftertreatment device 22 is an oxidation catalyst to process unburned fuel and CO. In another embodiment, a lean NOx aftertreatment device is employed to process the low levels of NOx when very low NOx levels are required or when HCCI operation is extended into regions at which the NOx produced is somewhat higher than typical HCCI combustion. In this embodiment, the lean NOx aftertreatment device is either a lean NOx trap or a lean NOx catalyst. A lean NOx trap stores NOx during lean operation. When the trap is no longer able to store additional NOx, the trap is purged by operating lean for a period of time. During the lean operation, the NOx is desorbed from the trap and reacted to $N_2$ and $O_2$. To accomplish a rich excursion with HCCI, one alternative is to operate with a very high level of EGR to displace excess air. A lean NOx catalyst processes NOx in the presence of a reductant, either fuel or urea.

In FIG. 1, an indication of exhaust gas constituents is provided by an exhaust gas sensor, 60 and 62, situated in the exhaust ducts exiting each cylinder bank. Only a single sensor is shown in FIG. 1. Exhaust gas sensor 60 is an oxygen sensor, either heated or unheated, which provides an indication of whether the exhaust gas is near stoichiometry. In another embodiment, sensor 6o is a wide-range oxygen sensor provides a measure of exhaust gas stoichiometry. Exhaust gas sensor 62 measures NOx concentration. Alternatively, sensor 62 is a wide-range oxygen sensor. Only one exhaust gas sensor is shown in each of the exhaust ducts of engine 10. However, it is known to use multiple exhaust gas sensors. In one embodiment, both a wide-range oxygen sensor and a NOx sensor are placed in place of sensor 62. Furthermore, it is common practice to provide a sensor both upstream and downstream of an exhaust aftertreatment device. The inventors of the present invention contemplate any known exhaust gas sensor type in any location in the exhaust ducts.

The signal from an exhaust gas oxygen sensor 60 is commonly used for air-fuel ratio feedback control of SI combustion. Analogously, HCCI combustion timing is controlled by adjusting intake temperature, according to one alternative embodiment. Adjustment of intake temperature is feedback controlled based on a combustion parameter such as crank angle of peak pressure. Examples of sensors from which crank angle of peak pressure can be ascertained include: head bolt strain gauge, in-cylinder pressure sensor, ionization sensor, a head gasket sensor, sensor measuring instantaneous flywheel speed, etc. For stoichiometric SI combustion, it is well known by those skilled in the art that the crank angle of peak pressure corresponding to peak efficiency operation (at a given speed/torque condition) occurs roughly at 15 degrees after top dead center. Alternative combustion systems, particular lean burn, tend to have the crank angle of peak pressure occur at a somewhat earlier time, e.g., 12 degrees after top dead center to achieve peak efficiency. Furthermore, there are other objectives, besides achieving peak efficiency, such as emission control, which cause the desired crank angle of peak pressure to be other than that providing peak efficiency. It is expected that a desired crank angle of peak pressure is in a range of 5 to 20 degrees after top center. Various combustion control parameters, such as: intake temperature, EGR valve position, throttle valve position, flow through an intake heat exchanger, and pressure charging, can be feedback controlled based on crank angle of peak pressure, particularly for the HCCI cylinders.

Because HCCI combustion is dilute, the peak torque capable from a given cylinder is much less than peak torque from a SI cylinder. To increase the amount of torque from a HCCI cylinder, compressor 34 increases the intake manifold pressure on the HCCI cylinders, allowing for an increased amount of fuel delivery while maintaining a high dilution. As shown in FIG. 1, compressor 34 is connected by a shaft to turbine 32, a device known as a turbocharger. The unconventional ducting of FIG. 1 has turbine 32 extracting work from SI cylinder exhaust gases which compress intake gases of HCCI cylinders via compressor 34. HCCI combustion is known to provide superior fuel efficiency to SI combustion. Thus, HCCI exhaust gases have a lower enthalpy than SI exhaust gases because HCCI allows more of the energy release of combustion to be extracted. Thus, it is desirable to extract the SI exhaust gas energy to pressure charge the HCCI inlet. In another embodiment, exhaust turbine 32 is coupled to the HCCI exhaust duct. The turbocharger of FIG. 1 is a variable geometry turbocharger. In yet another embodiment, a supercharger is provided in place of turbocharger (comprising elements 32, 34, and 36). A supercharger is a compressor, like compressor 34 of FIG. 1, which is driven by engine 10. A supercharger is not coupled to a turbine.

In FIG. 1, an intake gas heat exchanger 38 is contained with the exhaust duct coupled to the SI cylinders. It is known in the art that one of the methods to control ignition timing of HCCI combustion is by controlling the intake temperature. Diverter valve 37 allows adjustment of the quantity of HCCI intake gases passing through heat exchanger 38 and the quantity passing through bypass duct 35, thereby providing control of HCCI intake temperature.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are commands to fuel injectors 26 and 28 such as fuel injection timing, fuel injection rate, and fuel injection duration. Additional parameters under CPU 46 control are position of throttle valves 24, timing of spark plug 58, position of control EGR valves 39, other control valves 37, variable geometry turbocharger nozzle position, intake and exhaust valve timing, and others. Sensors 42 communicating input through I/O interface 44 may include piston position, engine rotational speed, vehicle speed, coolant temperature, intake manifold pressure, accelerator pedal position, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 2A:
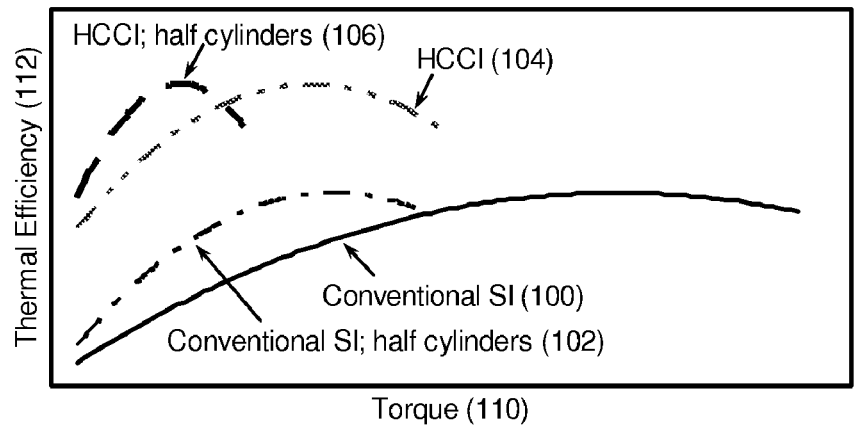
FIGS. 2a-2c are graphs of torque vs. fuel efficiency for prior art SI and HCCI engines and an engine according to an aspect of the present invention.

Referring to FIG. 2a, a graph of thermal efficiency as a function of torque is shown for a conventional SI engine as curve 100. Curve 104 indicates the higher thermal efficiency that is possible when operating the same displacement engine in the HCCI combustion mode. The thermal efficiency is markedly improved. However, HCCI does not provide the same range in torque as a SI engine of the same displacement. To provide the same torque level, either the displacement of the engine has to be roughly doubled or combustion mode is changed from HCCI at low torque and then SI when higher torque is demanded.

Also shown in FIG. 2a are curves 102 and 106, which is only half of the engine cylinders operating on SI and HCCI respectively. The peak thermal efficiency is the same as the corresponding curves 100 and 104 when the engine is operated with all cylinders on SI and HCCI, respectively. The range in torque, is half that of the running the whole engine.

Figure 2B:
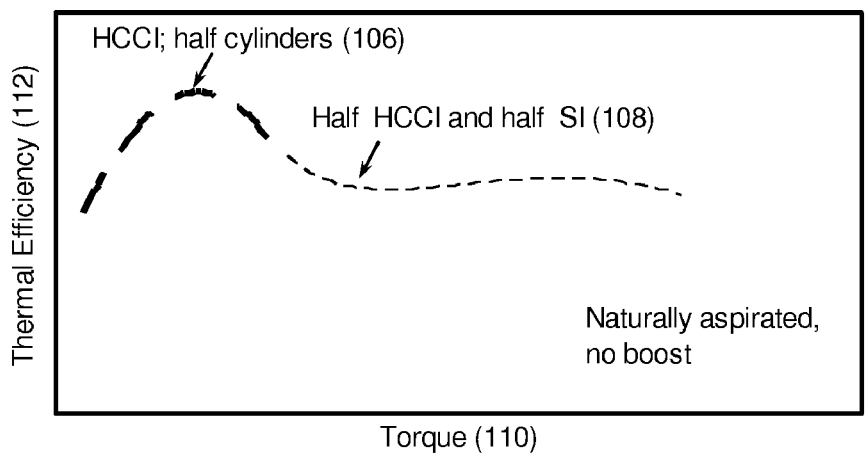

According to an aspect of the present invention, half of the cylinders are operated with HCCI combustion and half of the cylinders are operated with SI combustion, the effect of such operation on torque and thermal efficiency being shown in FIG. 2b. Note that FIG. 2b relates to a naturally aspirated engine in which there is no supercharger or turbocharger to pressurize intake gases. Because of the high efficiency of HCCI combustion, it is desirable to operate only the HCCI cylinders at low torque demands. Thus, curve 106 of FIGS. 2a and 2b are identical, i.e., half of the cylinders operating on HCCI and the other cylinders being deactivated. When a higher demand in torque is desired, SI cylinders are activated and torque is being provided by both the SI and HCCI cylinders, shown as curve 108 in FIG. 2b. Because HCCI cylinders cannot provide the same torque range as SI, the peak torque in FIG. 2b is less than what is shown in FIG. 2a. The efficiency shown in FIG. 2b exceeds that of the SI engine efficiency, curve 102, of FIG. 2a at all values of torque.

Figure 2C:
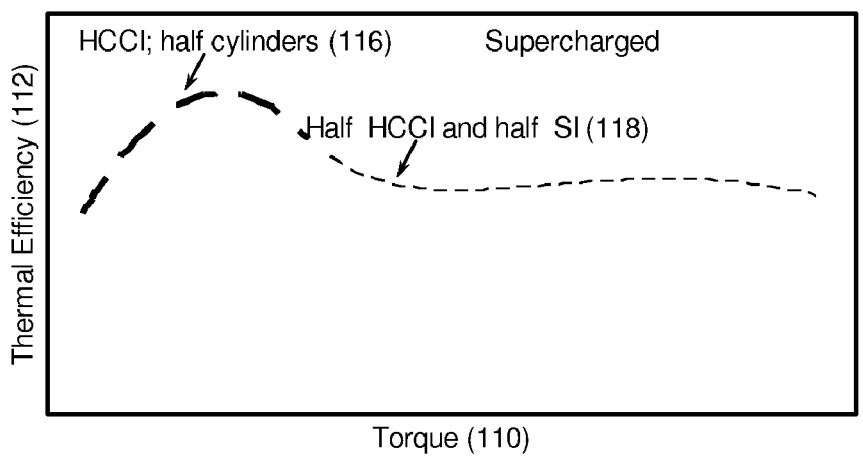

To make up for the lesser torque of the engine illustrated in FIG. 2b, either the displacement of the engine can be increased or boosting applied. Boosting can be applied to the HCCI cylinders or all engine cylinders. However, as discussed above, since HCCI provides less torque, an approach for HCCI cylinders to match torque is to boost only HCCI cylinders. Curve 116 of FIG. 2c shows thermal efficiency where boost is provided by a supercharger. The torque range of curve 116 is wider than that of curve 106 (of FIG. 2b) due to the increased amount of air delivered to the HCCI cylinders by the supercharger. The torque level at which half HCCI and half SI (curve 118 of FIG. 2c) is invoked it higher than in FIG. 2b. The maximum torque in FIG. 2c is about that of FIG. 2a.

If a turbocharger were employed in place of a supercharger, no increase in torque range with HCCI only operation is possible because the SI cylinders are deactivated, thus no exhaust to drive the turbocharger.

Because achieving a sufficiently high temperature to cause autoignition is paramount in HCCI combustion, providing a robust cold start presents a serious hurdle for HCCI combustion. Those skilled in the art discuss starting on SI combustion and transitioning to HCCI combustion after the engine has achieved a suitable operating temperature. However, with the present invention, the cylinders are adapted to operate in only one combustion mode. To overcome, the inventors of the present invention contemplate starting on SI cylinders. During the period of SI combustion, air can be delivered to HCCI cylinders through heat exchanger 38. By blowing warm air through the HCCI cylinder bank 14, the engine surfaces can be preheated and ready for HCCI combustion. In addition, the engine coolant is heated by the SI cylinders and preheats the HCCI cylinders.

According to an aspect of the present invention, the SI cylinders are equipped with valve deactivators (not shown). During HCCI only operation, the SI cylinders are deactivated by closing off the intake and exhaust valves. The piston continues to reciprocate, but the gas in the cylinder at the last combustion event remains trapped in the cylinder. If the valves were allowed to remain active, the flow of air through SI cylinder bank 12 would flow into exhaust aftertreatment device 20. If device 20 is a three-way catalyst, oxygen would be absorbed onto the surfaces and when the SI cylinders were reactivated, the three-way catalyst would be unable to reduce NOx until such oxygen is removed from device 20. Furthermore, the flow of air through SI cylinder bank 20 cools the engine down, thereby making restart more difficult.

In one embodiment, valve deactivators are provided for the HCCI cylinders (not shown in FIG. 1). However, because HCCI combustion is more efficient than SI combustion, it is desirable to operate the HCCI cylinders whenever possible. When the HCCI cylinders have not attained a suitable operating temperature, the HCCI cylinders can be deactivated. However, according to an aspect of the invention discussed above, exhaust waste energy from SI cylinders is transferred to HCCI induction air via heat exchanger 38. Thus, it may be preferable to allow valves in HCCI cylinders to operate as normal to allow heating.

Referring to FIG. 3, a cold start is initiated in block 150. The engine starts operation on SI cylinders only, block 152. Induction air flows through heat exchanger 38 and then through HCCI cylinders to warm up the HCCI cylinders, block 154. In block 156, it is determined whether a sufficient temperature has been achieved. If so, operation in the HCCI cylinders is initiated in block 158. If the torque that can be produced by the HCCI cylinders is sufficient to meet torque demand (determined in block 160), control is passed to block 162 in which the SI cylinders are deactivated. If not enough torque can be produced in the HCCI cylinders, the engine is operated with all cylinders active, block 164.

Figure 4A:
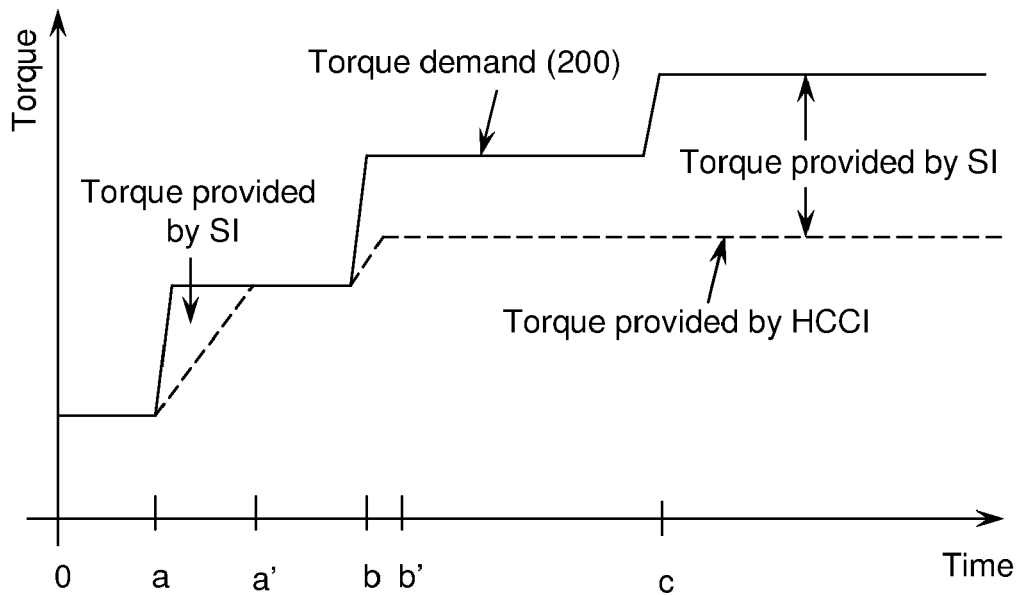
FIGS. 4a and 4b are graphs of driver demanded torque over time for an engine according to the present invention.

In FIG. 4a, a hypothetical driver torque demand as a function of time is shown as line 200. Between time o and time a, the driver demands a relatively low torque, at time a, the driver pushes down the accelerator pedal, which indicates demand for higher torque. The driver again demands increased torque at times b and c. Between times o and a, only the HCCI cylinders are active. Since the HCCI combustion mode provides superior fuel economy and the HCCI cylinders are capable of providing the desired torque, the SI cylinders are deactivated. As the torque demand isn't changing, there is no concern about the slow transient response of HCCI combustion. When the transition to a higher torque is demanded at time a, the HCCI cylinders cannot respond quickly enough to attain the new, higher torque. At time a', the HCCI cylinders have attained the desired torque level. However, between time a and a', if only HCCI cylinders were active, the torque response of the vehicle would be unacceptable to the operator of the vehicle. Thus, according to the present invention, the SI cylinders are activated at time a so that the operator demanded torque can be more closely followed than with HCCI cylinders alone. As the HCCI cylinders ramp up their torque production, the SI cylinders are ramped down and eventually deactivated at time a'. At time b, another rapid torque increase is demanded. Again, the SI cylinders are activated to fill in and the torque produced by the HCCI cylinders is ramped up. As at time a when a rapid torque increase is demanded, the HCCI cylinders are too slow to provide the transient response requested. Thus, the SI cylinders are reactivated at time b. At time b', the HCCI engines have attained their maximum torque output condition. Thus at time b', the SI cylinders remain active. At time c, the further increase in demanded torque is provided solely by the SI cylinders because the HCCI cylinders are already operating at their peak capacity.

Figure 4B:
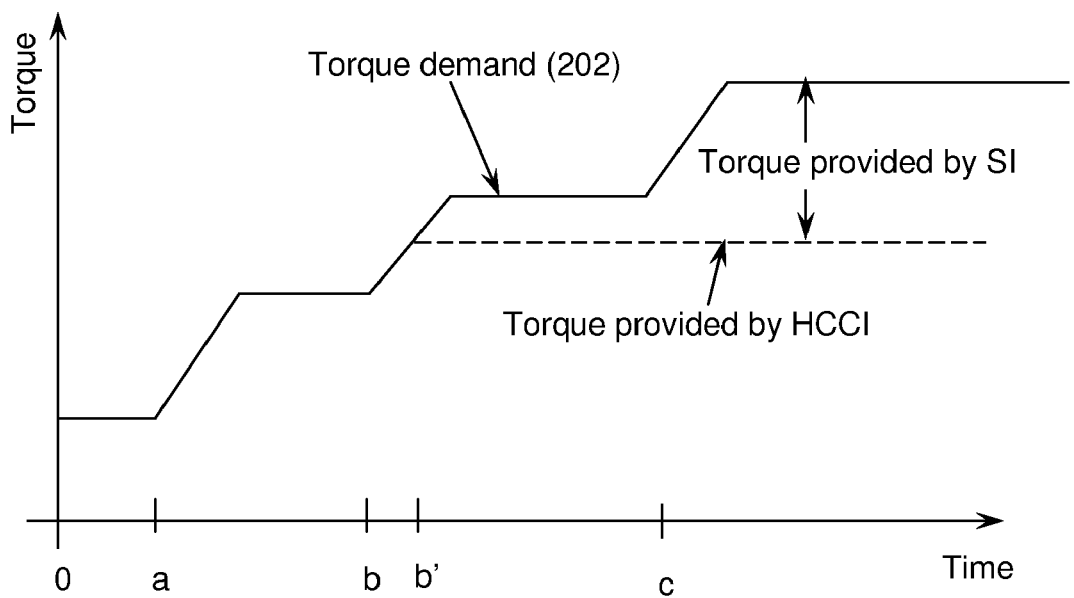

In FIG. 4b, a similar increase in torque is shown, however with a much slower demand for transient torque response. From time o to time b', the driver demand is slow enough that the HCCI cylinders can provide the desired torque demand. At time b', the HCCI cylinders have reached their capacity and the SI cylinders are activated. Further increases in torque are provided by the SI cylinders.

In another embodiment, the SI cylinders remain active at all times. In one example of this embodiment, an 8-cylinder is started on 2 SI cylinders. The remaining 6 cylinders are HCCI cylinders, which are turned on when they reach a suitable temperature which supports robust HCCI combustion. In this embodiment, the SI cylinders remain operational even after HCCI combustion has been achieved in the 6 HCCI cylinders.

Referring now to FIG. 5, a HCCI bank 14 and a SI bank 12 are incorporated in engine 10. The arrangement of FIG. 5 is provided simply for ease of illustration. As discussed above, various arrangements are contemplated by the inventors of the present invention, in one example each bank has one HCCI cylinder and three SI cylinders with complicated manifolding to keep their intake and exhaust gases separated.) Bank 12 is provided with exhaust 16 and bank 14 is provided with exhaust 18. A portion of exhaust gases from bank 12 may be drawn off by an EGR system through EGR valve 70. Similarly, exhaust gases are drawn from an exhaust from bank 14 through EGR valve 72. Both EGR ducts flow into the intake to bank 14. The intake to bank 14 is also supplied with throttle valve 24. Throttle valve 24, EGR valve 70 and EGR valve 72 are controlled by electronic control unit 40.

Because HCCI combustion is very dilute, HCCI combustion gases are at a much lower temperature than SI combustion gases. By controlling the proportion of EGR gases coming from bank 12 and from bank 14, the temperature in HCCI cylinders is controlled. As mentioned above, one of the ways, known by those skilled in the art, for controlling HCCI combustion timing is by adjusting the temperature of the gases in the HCCI cylinder. By continuing to operate SI cylinders while HCCI cylinders are operating, the exhaust gases from SI cylinders is available for recycle to the HCCI cylinders for controlling temperature in HCCI cylinders.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for operating an internal combustion engine, comprising:
    operating a first portion of engine cylinders in homogeneous charge compression ignition combustion mode wherein a second portion of engine cylinders are deactivated; and
    activating said second portion of engine cylinders in spark ignition combustion mode when a torque demand is greater than said first portion of engine cylinders is capable of supplying.

2. The method of claim 1 wherein a fueling rate to said first portion of engine cylinders is decreased when said second portion of cylinders is activated, said first and second portions comprise all engine cylinders, and said first portion and said second portion are mutually exclusive.

3. The method of claim 1, further comprising: deactivating said second portion of engine cylinders when said torque demand is lessened such that said first portion of engine cylinders is capable of supplying said torque.

4. The method of claim 1 wherein a compression ratio of said first portion of engine cylinders is more than two ratios less than a compression ratio of said second portion of engine cylinders.

5. An internal combustion engine, comprising:
    a first portion of engine cylinders having a compression ratio less than 11.5:1;
    a second portion of engine cylinders having a compression ratio greater than 13.5:1; and
    an electronic control unit coupled to said first and second portions of cylinders, said electronic control unit deactivating said second portion of engine cylinders when said first portion of engine cylinders is capable of supplying demanded torque wherein said second portion of engine cylinders operates in a homogeneous charge compression ignition combustion mode.

6. The engine of claim 5 wherein said electronic control unit activates said second portion of engine cylinders when said first portion of engine cylinders provides less torque than demanded.

7. The engine of claim 6 wherein said second portion of engine cylinders operates in a spark ignition combustion mode.

8. The engine of claim 6 wherein said activation includes activating intake and exhaust valves coupled to cylinders of said first portion of engine cylinders, activating fuel injectors coupled to cylinders of said first portion of engine cylinders, and providing signals to fire spark plugs coupled to cylinders of said first portion of engine cylinders.

9. A method of operating an internal combustion engine, comprising:
    operating a first portion of engine cylinders in a homogeneous charge compression ignition combustion mode;
    operating a second portion of engine cylinders in a spark ignition combustion mode; and
    increasing fuel delivery to said second portion of cylinders and maintaining fuel delivery substantially constant to said first portion of cylinders in response to a torque increase demand.

10. The method of claim 9 wherein said first portion of cylinders have a compression ratio at least two ratios greater than said second portion of cylinders.

11. The method of claim 9, further comprising:
increasing fuel delivery to said first portion of cylinders; and
decreasing fuel delivery to said second portion of cylinders wherein said increasing fuel to said first portion of cylinders and said decreasing to said second portion of cylinders are accomplished after said increasing of fuel delivery to said second portion of cylinders and in such a manner that said increased torque demand is provided by the engine.

12. A method for operating an internal combustion engine, comprising:
operating a first portion of engine cylinders in homogeneous charge compression ignition combustion mode wherein a second portion of engine cylinders are deactivated; and
activating said second portion of engine cylinders in spark ignition combustion mode when a rate of torque demand is greater than said first portion of engine cylinders is capable of supplying.

13. The method of claim 12, further comprising:
increasing torque supplied by said first portion of engine cylinders and decreasing torque supplied by said second portion of engine cylinders in response to said torque demand.

14. The method of claim 12, further comprising: deactivating said second portion of engine cylinders when said first portion of engine cylinders is capable of providing said demanded torque.

15. The method of claim 14 wherein said deactivating comprises deactivating intake and exhaust valves coupled to said second portion of engine cylinders such that said intake and exhaust valves remain closed.

16. The method of claim 15 wherein said deactivating further comprises discontinuing fuel supply to said second portion of engine cylinders.

17. A method of operating an internal combustion engine, comprising:
operating a first portion of engine cylinders in a homogeneous charge compression ignition combustion mode;
activating a second portion of engine cylinders in a spark ignition combustion mode in response to a demand for an increased torque wherein after said demanded torque increase is satisfied by activating said second portion of engine cylinder, the method further comprising:
reducing an amount of fuel supplied to said second portion of engine cylinders; and
increasing an amount of fuel supplied to said first portion of engine cylinders, such that said demanded torque increase is maintained through said reducing and increasing.

18. The method of claim 17 wherein said first portion of engine cylinders is capable of providing said demanded torque increase but with an unacceptable torque response.

19. The method of claim 17, further comprising: deactivating said second portion of engine cylinders when said demanded torque increase can be supplied by said first portion of engine cylinders.

* * * * *